(12) United States Patent
Aull et al.

(10) Patent No.: US 11,127,315 B2
(45) Date of Patent: Sep. 21, 2021

(54) MODULAR DISPLAY SYSTEM

(71) Applicant: The Goodyear Tire & Rubber Company, Akron, OH (US)

(72) Inventors: Joseph Louis Aull, Uniontown, OH (US); Paul Bryan Maxwell, Kent, OH (US); Jonathan James Shondel, Massillon, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 623 days.

(21) Appl. No.: 15/689,240

(22) Filed: Aug. 29, 2017

(65) Prior Publication Data

US 2019/0066541 A1 Feb. 28, 2019

(51) Int. Cl.
| | |
|---|---|
| *G09B 25/00* | (2006.01) |
| *G09B 25/02* | (2006.01) |
| *B60C 11/03* | (2006.01) |
| *B60C 19/00* | (2006.01) |
| *G09B 1/34* | (2006.01) |
| *G09B 1/36* | (2006.01) |
| *G09F 5/00* | (2006.01) |

(52) U.S. Cl.
CPC ............. *G09B 25/02* (2013.01); *B60C 11/03* (2013.01); *B60C 19/00* (2013.01); *G09B 1/34* (2013.01); *G09B 1/36* (2013.01); *G09F 5/00* (2013.01)

(58) Field of Classification Search
CPC ................................. G09B 25/00; G09B 25/02
USPC .... 434/365, 367, 376; 52/578, 588.1, 589.1; 301/13.1
See application file for complete search history.

(56) References Cited

U.S. PATENT DOCUMENTS

| | | | | | |
|---|---|---|---|---|---|
| 1,103,813 | A | * | 7/1914 | Murray | B60B 11/06 |
| | | | | | 301/13.1 |
| 1,258,461 | A | * | 3/1918 | Reid | B60B 11/06 |
| | | | | | 301/13.1 |
| 1,405,972 | A | * | 2/1922 | Dalton | B60C 7/00 |
| | | | | | 152/301 |
| 1,490,183 | A | * | 4/1924 | Parsons | B60C 7/00 |
| | | | | | 152/376 |
| 2,069,321 | A | * | 2/1937 | Mclaughlin | A47F 7/04 |
| | | | | | 211/24 |
| 3,864,860 | A | * | 2/1975 | Merzweiler | G09F 23/00 |
| | | | | | 40/587 |
| 4,468,910 | A | * | 9/1984 | Morrison | A01K 1/0157 |
| | | | | | 52/591.2 |
| 4,860,510 | A | * | 8/1989 | Kotler | E01C 13/045 |
| | | | | | 52/177 |
| 4,952,154 | A | * | 8/1990 | Pruitt | G09B 25/02 |
| | | | | | 434/365 |
| 5,174,760 | A | * | 12/1992 | Gray | G01M 17/02 |
| | | | | | 40/406 |
| 5,190,799 | A | * | 3/1993 | Ellingson, III | E04F 15/10 |
| | | | | | 15/215 |

(Continued)

*Primary Examiner* — Kurt Fernstrom
(74) *Attorney, Agent, or Firm* — Robert N. Lipcsik

(57) ABSTRACT

A first tread pattern display system for new tread patterns includes a first upper sidewall part, a second upper sidewall part, a first tread shoulder part, a second tread shoulder part, and a middle tread part. The first upper sidewall part removably attaches to the first tread shoulder part by a plurality of projections extending from the first upper sidewall part to corresponding recesses in the first tread shoulder part.

17 Claims, 6 Drawing Sheets

(56) References Cited

U.S. PATENT DOCUMENTS

| | | | | |
|---|---|---|---|---|
| 5,212,842 | A * | 5/1993 | Glydon | A63H 33/04 |
| | | | | 428/44 |
| 5,490,821 | A * | 2/1996 | Wu | A61H 7/001 |
| | | | | 15/215 |
| 6,461,167 | B1 * | 10/2002 | Gray | G09B 25/025 |
| | | | | 152/158 |
| 7,316,252 | B1 | 1/2008 | Heard | |
| 7,766,798 | B2 | 8/2010 | Hamilton | |
| 8,146,319 | B2 * | 4/2012 | McIntosh | E04F 15/02044 |
| | | | | 52/506.07 |
| 8,534,023 | B2 * | 9/2013 | Zhu | E04F 15/02 |
| | | | | 52/588.1 |
| 8,535,785 | B2 * | 9/2013 | Masanek, Jr. | E01C 5/226 |
| | | | | 264/273 |
| 8,732,953 | B2 * | 5/2014 | Schubetzer | F16B 5/0056 |
| | | | | 29/897.2 |
| 8,833,007 | B2 * | 9/2014 | Tillery | E04F 15/02 |
| | | | | 52/177 |
| 9,103,128 | B2 * | 8/2015 | Pomberger | E04F 13/08 |
| 9,700,165 | B2 * | 7/2017 | Johnson | A47G 27/0231 |
| 2003/0154676 | A1 * | 8/2003 | Schwartz | A47G 27/0293 |
| | | | | 52/391 |
| 2006/0230701 | A1 * | 10/2006 | Pepa | B29C 70/78 |
| | | | | 52/592.1 |
| 2009/0211677 | A1 * | 8/2009 | Palinkas | B60C 7/102 |
| | | | | 152/209.1 |
| 2010/0200136 | A1 | 8/2010 | Hamilton | |
| 2013/0008066 | A1 | 1/2013 | Martigny | |
| 2014/0150939 | A1 | 6/2014 | Hamilton | |

* cited by examiner

MODULAR DISPLAY SYSTEM

FIELD OF THE INVENTION

The present invention relates to display systems and, more particularly, to a modular display system for displaying pneumatic tire treads.

BACKGROUND OF THE INVENTION

When displaying a potential new tread, tire manufacturers conventionally laser cut a small circumferential segment of the tread that extends axially across the entire tread width. Thus, a full blind is used for each single tread design.

SUMMARY OF THE INVENTION

A first tread pattern display system for new tread patterns, in accordance with the present invention, includes a first upper sidewall part, a second upper sidewall part, a first tread shoulder part, a second tread shoulder part, and a middle tread part. The first upper sidewall part removably attaches to the first tread shoulder part by a plurality of projections extending from the first upper sidewall part to corresponding recesses in the first tread shoulder part.

According to another aspect of the first system, the first tread shoulder part removably attaches to the middle tread part by a plurality of projections extending from both the first tread shoulder part and the middle tread part, respectively, to the middle tread part and the first tread shoulder part, respectively, to corresponding recesses in the middle tread part and the first tread shoulder part, respectively.

According to still another aspect of the first system, the middle tread part removably attaches to the second tread shoulder part by a plurality of projections extending from both the middle tread part and the second tread shoulder part, respectively, to the second tread shoulder part and the middle tread part, respectively, to corresponding recesses in the middle tread part and the second tread shoulder part, respectively.

According to yet another aspect of the first system, the middle tread part removably attaches to the second tread shoulder part by a plurality of projections extending from both the middle tread part and the second tread shoulder part, respectively, to the second tread shoulder part and the middle tread part, respectively, to corresponding recesses in the middle tread part and the second tread shoulder part, respectively.

According to still another aspect of the first system, the second tread shoulder part removably attaches to the second upper sidewall part by a plurality of projections extending from the second upper sidewall part to corresponding recesses in the second tread shoulder part.

Another tread pattern display system for new tread patterns, in accordance with the present invention, includes a first upper sidewall part having a first exterior design, a second upper sidewall part having a second exterior design, a first tread shoulder part having a third exterior design, a second tread shoulder part having a fourth exterior design, and a first middle tread part having a fifth exterior design. The first upper sidewall part removably attached to the first tread shoulder part by a plurality of projections extending from the first upper sidewall part to corresponding recesses in the first tread shoulder part. The first, second, third, fourth, and fifth exterior designs combining to form a complete tread and upper sidewall pattern.

According to another aspect of the second system, a third tread shoulder part has a sixth exterior design and the third tread shoulder part has identical connecting structures to connecting structures of the first tread shoulder part.

According to still another aspect of the second system, a third tread shoulder part has a sixth exterior design and the third tread shoulder part has identical connecting structures to connecting structures of the second tread shoulder part.

According to yet another aspect of the second system, a second middle tread part has a sixth exterior design and the second middle tread part has identical connecting structures to connecting structures of the first middle tread part.

According to still another aspect of the second system, a third upper sidewall part has a sixth exterior design and the third upper sidewall part has identical connecting structures to connecting structures of the first upper sidewall part.

A method in accordance with the present invention displays multiple tread designs. The method includes the steps of: connecting a first upper sidewall to a first tread shoulder; connecting the first tread shoulder part to a first middle tread part; connecting the first middle tread part to a second tread shoulder part, the first middle tread part having a part of a first tread design; connecting the second tread shoulder part to a second upper sidewall part; disconnecting the first middle tread part from the first tread shoulder part and the second tread shoulder part; and connecting a second middle tread part to the first tread shoulder part and the second tread shoulder part, the second middle tread part having part of a second tread design.

According to another aspect of the method, the method further includes the steps of: disconnecting the first tread shoulder part from the first upper sidewall part and the first middle tread part; and connecting a third tread shoulder part to the first upper sidewall part and the first middle tread part, the first tread shoulder part having part of a tread design different from a part of another tread design of the third tread shoulder part.

According to still another aspect of the method, the method further includes the steps of: removably attaching the first tread shoulder part to the first middle tread part by a plurality of projections extending from both the first tread shoulder part and the first middle tread part, respectively, to the first middle tread part and the first tread shoulder part, respectively, to corresponding recesses in the first middle tread part and the first tread shoulder part, respectively.

According to yet another aspect of the method, the method further includes the steps of removably attaching the first middle tread part to the second tread shoulder part by a plurality of projections extending from both the first middle tread part and the second tread shoulder part, respectively, to the second tread shoulder part and the first tread shoulder part, respectively, to corresponding recesses in the first tread shoulder part and the second tread shoulder part, respectively.

According to still another aspect of the method, the method further includes the steps of removably attaching the first middle tread part to the second tread shoulder part by a plurality of projections extending from both the middle tread part and the second tread shoulder part, respectively, to the second tread shoulder part and the middle tread part, respectively, to corresponding recesses in the middle tread part and the second tread shoulder part, respectively.

According to yet another aspect of the method, the method further includes the steps of removably attaching the second tread shoulder part to the second upper sidewall part by a plurality of projections extending from the second upper sidewall part to corresponding recesses in the second tread shoulder part.

According to still another aspect of the method, the method further includes the steps of removably attaching the first tread shoulder part to the second middle tread part by a plurality of projections extending from both the first tread shoulder part and the second middle tread part, respectively, to the second middle tread part and the first tread shoulder part, respectively, to corresponding recesses in the second middle tread part and the first tread shoulder part, respectively.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DEFINITIONS

Figure 1:
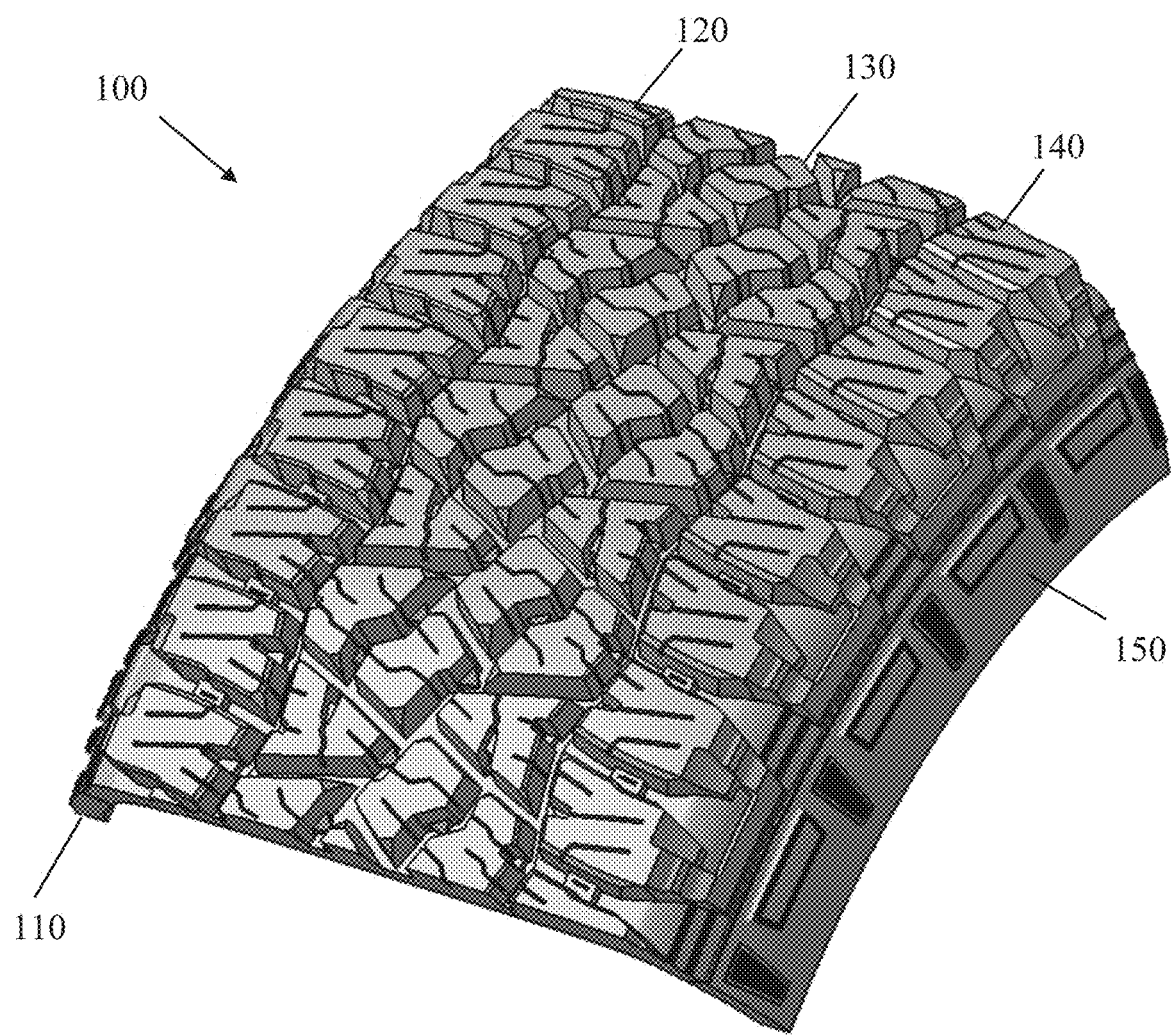
FIG. 1 is a schematic perspective view of a modular tread blank, in accordance with the present invention, displaying one example tread design.

"Apex" means an elastomeric filler located radially above the bead core and between the plies and the turnup ply.

"Annular" means formed like a ring.

"Aspect ratio" means the ratio of a tire section height to its section width.

"Aspect ratio of a bead cross-section" means the ratio of a bead section height to its section width.

"Asymmetric tread" means a tread that has a tread pattern not symmetrical about the centerplane or equatorial plane EP of the tire.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25° to 65° angle with respect to equatorial plane of the tire. If multiple plies are present, the ply cords run at opposite angles in alternating layers.

"Breakers" means at least two annular layers or plies of parallel reinforcement cords having the same angle with reference to the equatorial plane of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" means lines or directions extending along the perimeter of the surface of the annular tire parallel to the Equatorial Plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane. The "cord angle" is measured in a cured but uninflated tire.

"Crown" means that portion of the tire within the width limits of the tire tread.

"Denier" means the weight in grams per 9000 meters (unit for expressing linear density). "Dtex" means the weight in grams per 10,000 meters.

"Density" means weight per unit length.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made that forms the basic element of filaments. Characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Footprint" means the contact patch or area of contact of the tire tread with a flat surface at zero speed and under normal load and pressure.

"Gauge" refers generally to a measurement, and specifically to a thickness measurement.

"Groove" means an elongated void area in a tread that may extend circumferentially or laterally about the tread in a straight, curved, or zigzag manner. Circumferentially and laterally extending grooves sometimes have common portions. The "groove width" may be the tread surface occupied by a groove or groove portion divided by the length of such groove or groove portion; thus, the groove width may be its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves, which they interconnect, they may be regarded as forming "tie bars" tending to maintain a rib-like character in the tread region involved. As used herein, a groove is intended to have a width large enough to remain open in the tires contact patch or footprint.

"High Tensile Steel (HT)" means a carbon steel with a tensile strength of at least 3400 MPa at 0.20 mm filament diameter.

"Inner" means toward the inside of the tire and "outer" means toward its exterior.

"Innerliner" means the layer or layers of elastomer or other material that form the inside surface of a tubeless tire and that contain the inflating fluid within the tire.

"Inboard side" means the side of the tire nearest the vehicle when the tire is mounted on a wheel and the wheel is mounted on the vehicle.

"LASE" is load at specified elongation.

"Lateral" means an axial direction.

"Lay length" means the distance at which a twisted filament or strand travels to make a 360 degree rotation about another filament or strand.

"Load Range" means load and inflation limits for a given tire used in a specific type of service as defined by tables in The Tire and Rim Association, Inc.

"Mega Tensile Steel (MT)" means a carbon steel with a tensile strength of at least 4500 MPa at 0.20 mm filament diameter.

"Net contact area" means the total area of ground contacting elements between defined boundary edges divided by the gross area between the boundary edges as measured around the entire circumference of the tread.

"Net-to-gross ratio" means the total area of ground contacting tread elements between lateral edges of the tread around the entire circumference of the tread divided by the gross area of the entire circumference of the tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Normal Load" means the specific design inflation pressure and load assigned by the appropriate standards organization for the service condition for the tire.

"Normal Tensile Steel (NT)" means a carbon steel with a tensile strength of at least 2800 MPa at 0.20 mm filament diameter.

"Outboard side" means the side of the tire farthest away from the vehicle when the tire is mounted on a wheel and the wheel is mounted on the vehicle.

"Ply" means a cord-reinforced layer of rubber-coated radially deployed or otherwise parallel cords.

"Radial" and "radially" are used to mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Rib" means a circumferentially extending strip of rubber on the tread which is defined by at least one circumferential groove and either a second such groove or a lateral edge, the strip being laterally undivided by full-depth grooves.

"Rivet" means an open space between cords in a layer.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall insert" means elastomer or cord reinforcements located in the sidewall region of a tire. The insert may be an addition to the carcass reinforcing ply and outer sidewall rubber that forms the outer surface of the tire.

"Sidewall" means that portion of a tire between the tread and the bead.

"Sipe" or "incision" means small slots molded into the tread elements of the tire that subdivide the tread surface and improve traction; sipes may be designed to close when within the contact patch or footprint, as distinguished from grooves.

"Spring Rate" means the stiffness of tire expressed as the slope of the load deflection curve at a given pressure.

"Stiffness ratio" means the value of a control belt structure stiffness divided by the value of another belt structure stiffness when the values are determined by a fixed three point bending test having both ends of the cord supported and flexed by a load centered between the fixed ends.

"Super Tensile Steel (ST)" means a carbon steel with a tensile strength of at least 3650 MPa at 0.20 mm filament diameter.

"Tenacity" is stress expressed as force per unit linear density of the unstrained specimen (gm/tex or gm/denier). Used in textiles.

"Tensile" is stress expressed in forces/cross-sectional area. Strength in psi=12,800 times specific gravity times tenacity in grams per denier.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread element" or "traction element" means a rib or a block element.

"Tread width" means the arc length of the tread surface in a plane including the axis of rotation of the tire.

"Turnup end" means the portion of a carcass ply that turns upward (i.e., radially outward) from the beads about which the ply is wrapped.

"Ultra Tensile Steel (UT)" means a carbon steel with a tensile strength of at least 4000 MPa at 0.20 mm filament diameter.

"Vertical Deflection" means the amount that a tire deflects under load.

"Yarn" is a generic term for a continuous strand of textile fibers or filaments. Yarn occurs in the following forms: (1) a number of fibers twisted together; (2) a number of filaments laid together without twist; (3) a number of filaments laid together with a degree of twist; (4) a single filament with or without twist (monofilament); and (5) a narrow strip of material with or without twist.

DETAILED DESCRIPTION OF EXAMPLES OF THE PRESENT INVENTION

Figure 2:
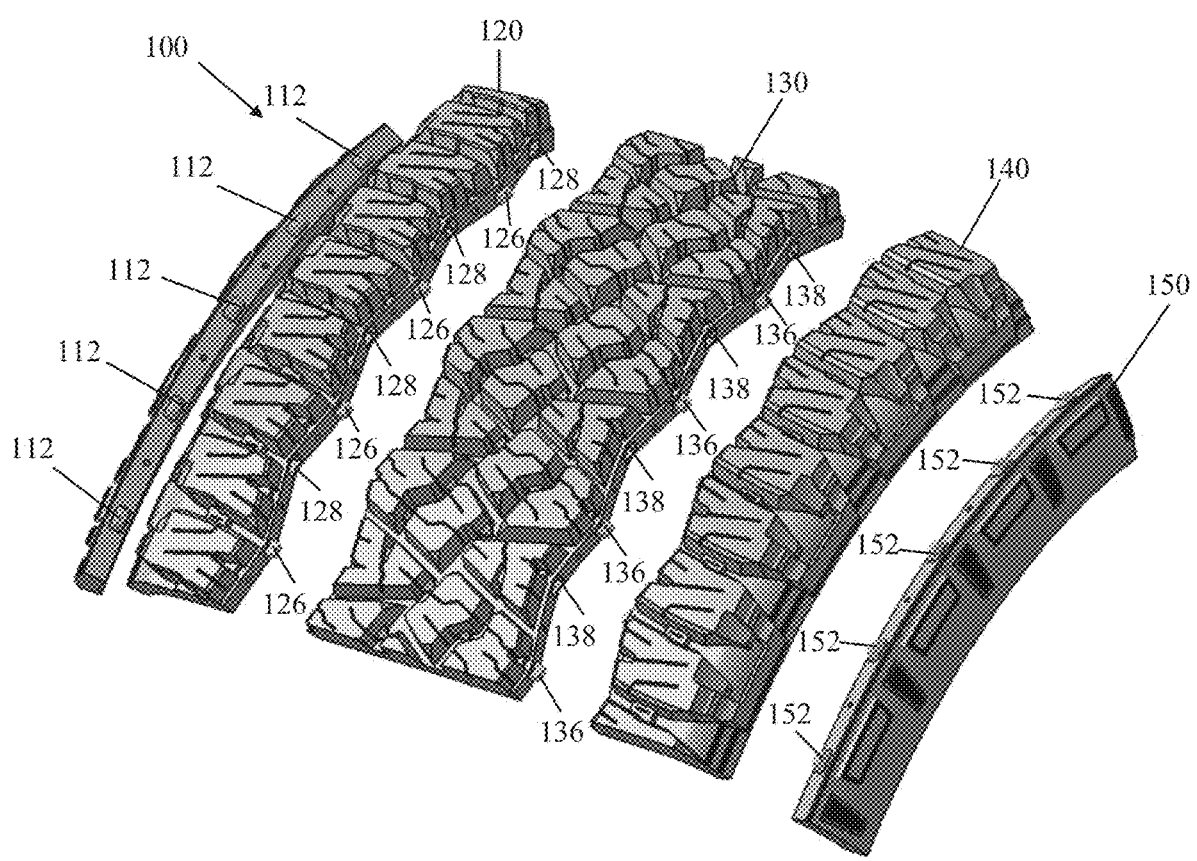
FIG. 2 is a schematic perspective exploded view of the tread blank of FIG. 1.
Figure 3:
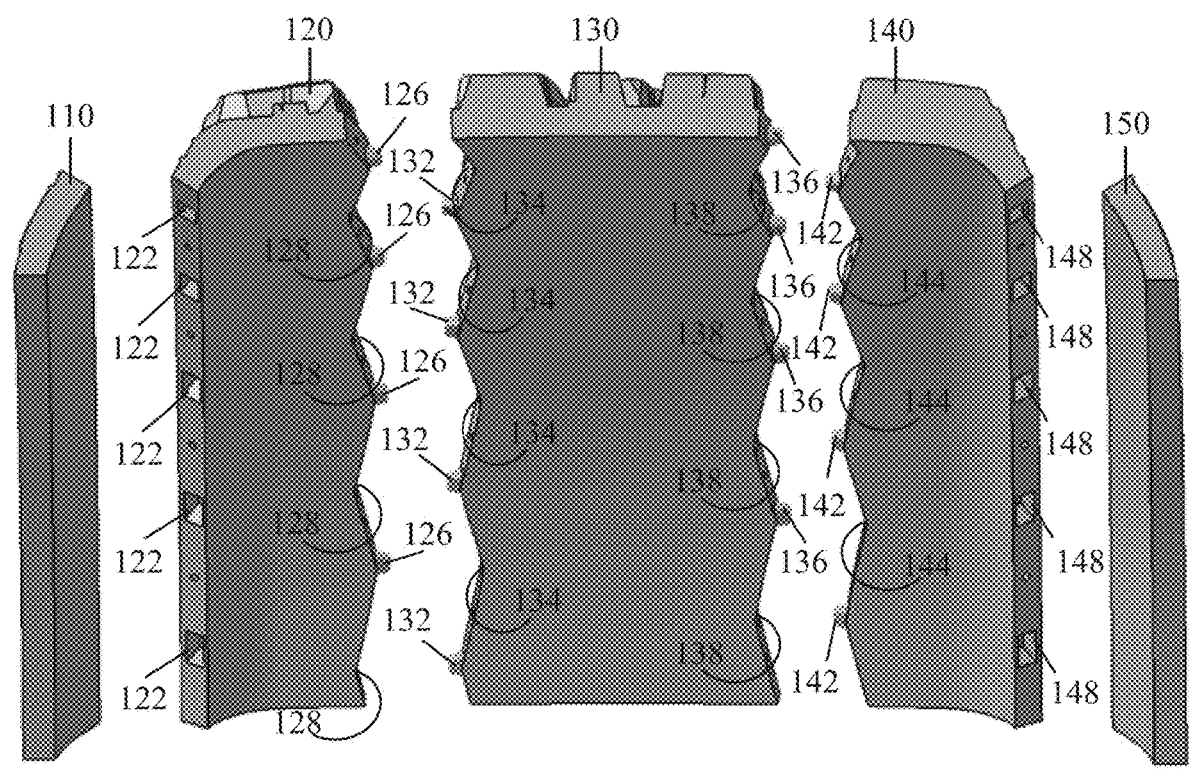
FIG. 3 is a schematic perspective exploded under view of the modular tread blank of FIG. 1.
Figure 4:
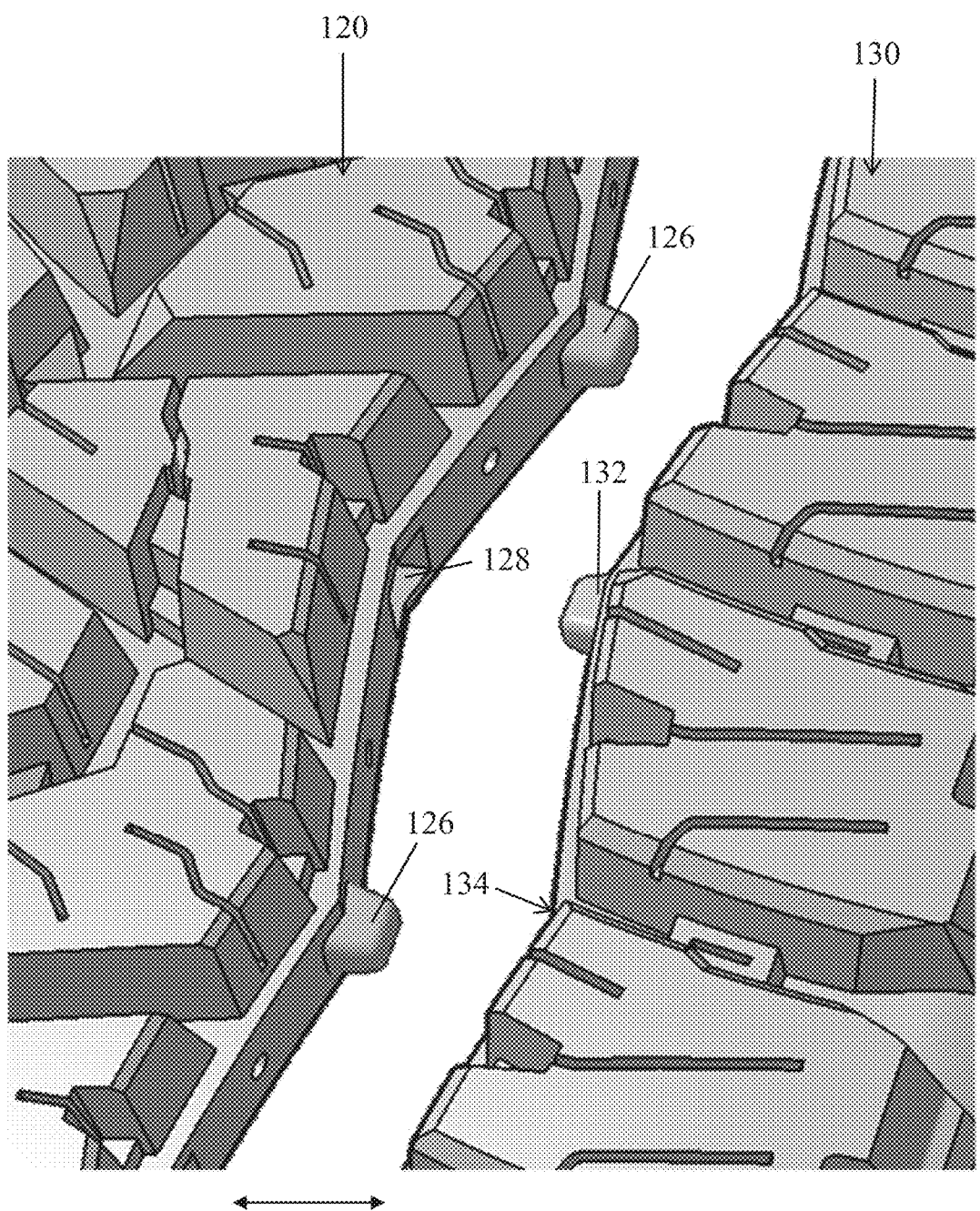
FIG. 4 is a schematic perspective exploded detail view of the connecting structure of two parts of the modular tread blank of FIG. 1.
Figure 5:
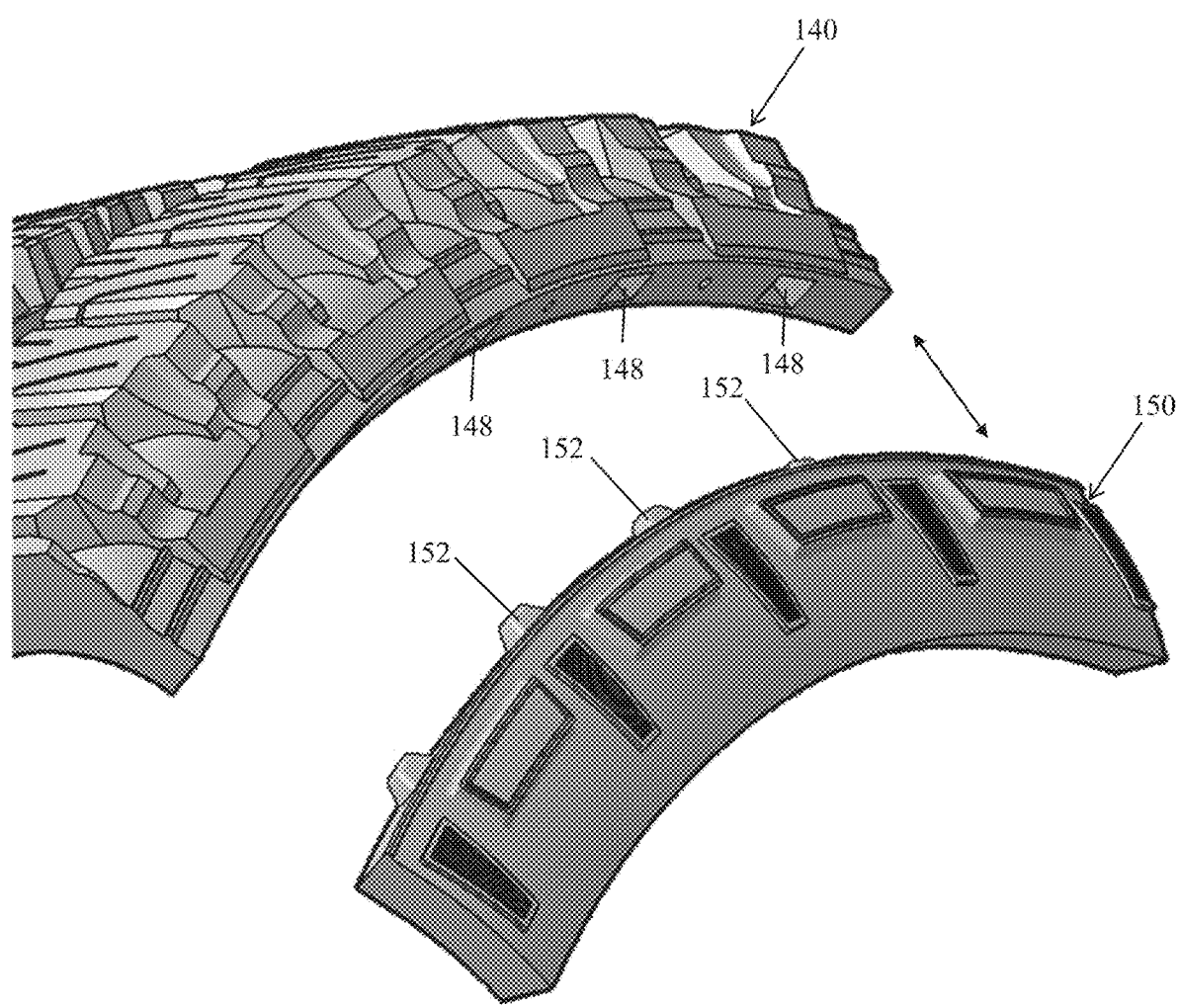
FIG. 5 is another schematic perspective exploded detail view of the connecting structure of two other parts of the modular tread blank of FIG. 1.

FIG. 1-3 show a modular tread blank 100 in accordance with the present invention displaying an example tread design. The tread blank 100 includes a first upper sidewall part 110, a second upper sidewall part 150, a first tread shoulder part 120, a second tread shoulder part 140, and a middle tread part 130.

The first upper sidewall part 110 may removably attach to the first tread shoulder part 120 by a plurality of projections 112 (5 shown) extending from the first upper sidewall part 110 to corresponding recesses 122 (5 shown) in the first tread shoulder part 120.

The first tread shoulder part 120 may removably attach to the middle tread part 130 by a plurality of projections 126 (4 shown), 132 (4 shown) extending from both the first tread shoulder part 120 and the middle tread part 130, respectively, to the middle tread part 130 and the first tread shoulder part 120, respectively, to corresponding recesses 134, 128 in the middle tread part 130 and the first tread shoulder part 120, respectively.

The middle tread part 130 may removably attach to the second tread shoulder part 140 by a plurality of projections 136 (4 shown), 142 (4 shown) extending from both the middle tread part 130 and the second tread shoulder part 140, respectively, to the second tread shoulder part 140 and the middle tread part 130, respectively, to corresponding recesses 144, 138 in the middle tread part 130 and the second tread shoulder part 140, respectively.

The second tread shoulder part 140 may removably attach to the second upper sidewall part 150 by a plurality of projections 152 (5 shown) extending from the second upper sidewall part 150 to corresponding recesses 148 (5 shown) in the second tread shoulder part 140.

Advantageously, these individual parts 110, 120, 130, 140, 150 may be constructed in many ways enhancing manufacturing flexibility, such as 3D printing, injection molding, laser cutting, traditional molding, etc. FIGS. 1-5 show one possible tread pattern. However, any of the five parts 110, 120, 130, 140, 150 may be replaced with another part that has the same connection characteristics, but a different tread pattern than that of the original part. In this manner, multiple tread patterns may be assembled and displayed with fewer pieces than having a one-piece, full tread blank for each tread design to be displayed.

As described above, a first tread pattern display system 100 for new tread patterns, in accordance with the present invention, includes a first upper sidewall part 110, a second upper sidewall part 150, a first tread shoulder part 120, a second tread shoulder part 140, and a middle tread part 130. The first upper sidewall part 110 removably attaches to the first tread shoulder part 120 by a plurality of projections 112 extending from the first upper sidewall part 110 to corresponding recesses 122 in the first tread shoulder part 120.

According to another aspect of the first system 100, the first tread shoulder part (120) removably attaches to the middle tread part 130 by a plurality of projections 126, 132 extending from both the first tread shoulder part 120 and the middle tread part 130, respectively, to the middle tread part 130 and the first tread shoulder part 120, respectively, to corresponding recesses 128, 134 in the middle tread part 130 and the first tread shoulder part 120, respectively.

According to still another aspect of the first system 100, the middle tread part 130 removably attaches to the second tread shoulder part 140 by a plurality of projections 136, 142 extending from both the middle tread part 130 and the second tread shoulder part 140, respectively, to the second tread shoulder part 140 and the middle tread part 130, respectively, to corresponding recesses 138, 144 in the middle tread part 130 and the second tread shoulder part 140, respectively.

According to still another aspect of the first system, the second tread shoulder part 140 removably attaches to the second upper sidewall part 150 by a plurality of projections 152 extending from the second upper sidewall part 150 to corresponding recesses 148 in the second tread shoulder part 140.

According to yet another aspect of the first system 100, the middle tread part 130 fixedly attaches (e.g., molding, welding, adhesive, etc.) to the second tread shoulder part 140 by a plurality of projections 136, 142 extending from both the middle tread part 130 and the second tread shoulder part 140, respectively, to the second tread shoulder part 140 and the middle tread part 130, respectively, to corresponding recesses 138, 144 in the middle tread part 130 and the second tread shoulder part 140, respectively Another second tread pattern display system 100 for new tread patterns, in accordance with the present invention, includes a first upper sidewall 110 part having a first exterior design, a second upper sidewall part 150 having a second exterior design, a first tread shoulder part 120 having a third exterior design, a second tread shoulder part 140 having a fourth exterior design, and a first middle tread part 150 having a fifth exterior design. The first upper sidewall part 110 removably attaches to the first tread shoulder part 120 by a plurality of projections 112 extending from the first upper sidewall part 110 to corresponding recesses 122 in the first tread shoulder part 120. The first, second, third, fourth, and fifth exterior designs combine to form a complete tread and upper sidewall pattern (FIG. 1).

According to another aspect of the second system 100, a third tread shoulder part (not shown) has a sixth exterior design and the third tread shoulder part has identical connecting structures to connecting structures 122, 126, 128 of the first tread shoulder part 120.

According to still another aspect of the second system 100, a third tread shoulder part (not shown) has a sixth exterior design and the third tread shoulder part has identical connecting structures to connecting structures 142, 144, 148 of the second tread shoulder part 140.

According to yet another aspect of the second system 100, a second middle tread part 630 (FIG. 6) has a sixth exterior design and the second middle tread part 630 has identical connecting structures to connecting structures 132, 134, 136, 138 of the first middle tread part 130.

According to still another aspect of the second system 100, a third upper sidewall part (not shown) has a sixth exterior design and the third upper sidewall part has identical connecting structures to connecting structures 112 of the first upper sidewall part 110.

Figure 6:
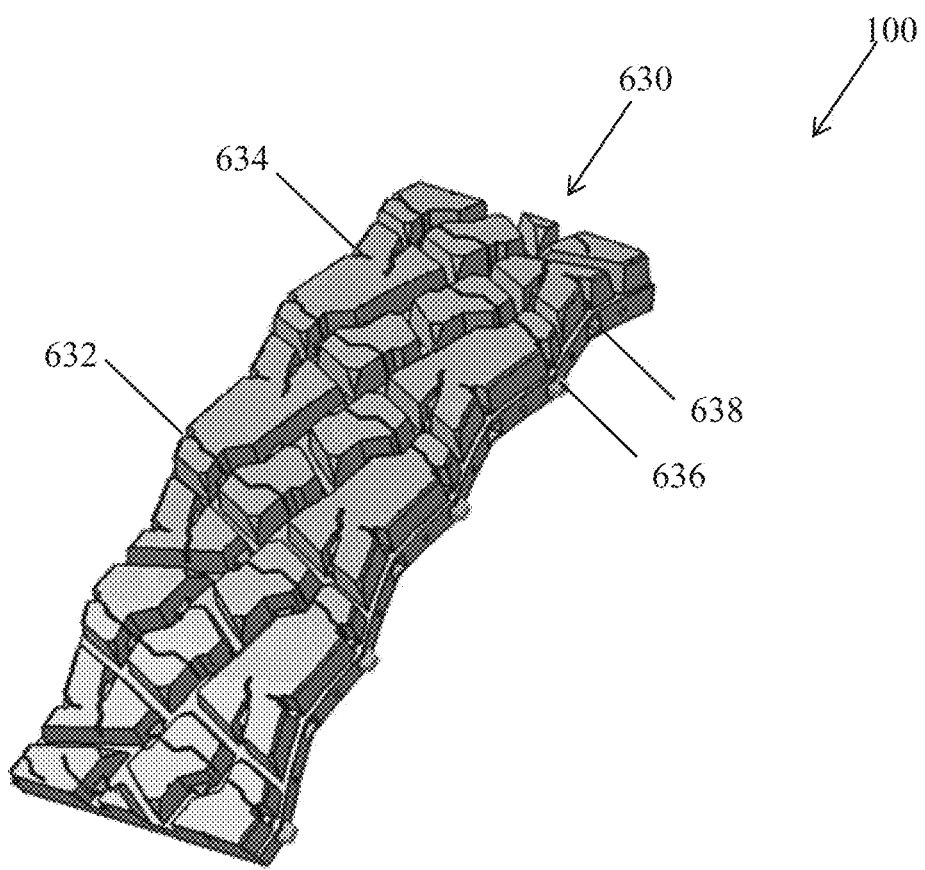
FIG. 6 is a schematic perspective of another part for adding to the modular tread blank of FIGS. 1-5.

A method 100 in accordance with the present invention displays multiple tread designs (FIGS. 1 & 6). The method 100 includes the steps of: connecting a first upper sidewall part 110 to a first tread shoulder part 120; connecting the first tread shoulder part 120 to a first middle tread part 130; connecting the first middle tread part 130 to a second tread shoulder part 140, the first middle tread part 130 having a part of a first tread design (FIG. 2); connecting the second tread shoulder part 140 to a second upper sidewall part 150; disconnecting the first middle tread part 130 from the first tread shoulder part 120 and the second tread shoulder part 140; and connecting a second middle tread part 630 to the first tread shoulder part 120 and the second tread shoulder part 140, the second middle tread part 630 having part of a second tread design (FIG. 6) and connecting structures 632, 634, 636, 638 (FIG. 6) identical to the connecting structures 132, 134, 136, 138 of the first middle tread part 130 (FIG. 1).

According to another aspect of the method 100, the method further includes the steps of: disconnecting the first tread shoulder part 120 from the first upper sidewall part 110 and the first middle tread part 130; and connecting a third tread shoulder part (not shown) to the first upper sidewall part 110 and the first middle tread part 130, the first tread shoulder part 120 having part of a tread design different from a part of another tread design of the third tread shoulder part.

According to still another aspect of the method 100, the method further includes the steps of: removably attaching the first tread shoulder part 110 to the first middle tread part 130 by a plurality of projections 126, 132 extending from both the first tread shoulder part 120 and the first middle tread part 130, respectively, to the first middle tread part 130 and the first tread shoulder part 120, respectively, to corresponding recesses 134, 128 in the first middle tread part 130 and the first tread shoulder part 120, respectively.

According to yet another aspect of the method 100, the method further includes the steps of removably attaching the first middle tread part 130 to the second tread shoulder part 140 by a plurality of projections 136, 142 extending from both the first middle tread part 130 and the second tread shoulder part 140, respectively, to the second tread shoulder part 140 and the first middle tread part 130, respectively, to corresponding recesses 138, 144 in the middle tread part 130 and the second tread shoulder part 140, respectively.

According to yet another aspect of the method 100, the method further includes the steps of removably attaching the second tread shoulder part 140 to the second upper sidewall part 150 by a plurality of projections 152 extending from the second upper sidewall part 150 to corresponding recesses 148 in the second tread shoulder part 140.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

What is claimed:

1. A tread pattern display system for new tread patterns, the system comprising:
    a first upper sidewall part;
    a second upper sidewall part;
    a first tread shoulder part;
    a second tread shoulder part; and
    a middle tread part, the first upper sidewall part removably attached to the first tread shoulder part by a plurality of projections extending from the first upper sidewall part to corresponding recesses in the first tread shoulder part.

2. The system as recited in claim 1 wherein the first tread shoulder part removably attaches to the middle tread part by a plurality of projections extending from both the first tread shoulder part and the middle tread part, respectively, to the middle tread part and the first tread shoulder part, respectively, to corresponding recesses in the middle tread part and the first tread shoulder part, respectively.

3. The system as recited in claim 2 wherein the middle tread part removably attaches to the second tread shoulder part by a plurality of projections extending from both the middle tread part and the second tread shoulder part, respectively, to the second tread shoulder part and the middle tread part, respectively, to corresponding recesses in the middle tread part and the second tread shoulder part, respectively.

4. The system as recited in claim 3 wherein the middle tread part fixedly attaches to the second tread shoulder part by a plurality of projections extending from both the middle tread part and the second tread shoulder part, respectively, to the second tread shoulder part and the middle tread part, respectively, to corresponding recesses in the middle tread part and the second tread shoulder part, respectively.

5. The system as recited in claim 3 wherein the second tread shoulder part removably attaches to the second upper sidewall part by a plurality of projections extending from the second upper sidewall part to corresponding recesses in the second tread shoulder part.

6. A tread pattern display system for new tread patterns, the system comprising:
    a first upper sidewall part having a first exterior design;
    a second upper sidewall part having a second exterior design;
    a first tread shoulder part having a third exterior design;
    a second tread shoulder part having a fourth exterior design; and
    a first middle tread part having a fifth exterior design, the first upper sidewall part removably attached to the first tread shoulder part by a plurality of projections extending from the first upper sidewall part to corresponding recesses in the first tread shoulder part, the first, second, third, fourth, and fifth exterior designs combining to form a complete tread and upper sidewall pattern.

7. The system as set forth in claim 5 further including a third tread shoulder part having a sixth exterior design, the third tread shoulder part having identical connecting structures to connecting structures of the first tread shoulder part.

8. The system as set forth in claim 5 further including a third tread shoulder part having a sixth exterior design, the third tread shoulder part having identical connecting structures to connecting structures of the second tread shoulder part.

9. The system as set forth in claim 5 further including a second middle tread part having a sixth exterior design, the second middle tread part having identical connecting structures to connecting structures of the first middle tread part.

10. The system as set forth in claim 5 further including a third upper sidewall part having a sixth exterior design, the third upper sidewall part having identical connecting structures to connecting structures of the first upper sidewall part.

11. A method for displaying multiple tread designs, the method comprising the steps of:
    connecting a first upper sidewall to a first tread shoulder;
    connecting the first tread shoulder part to a first middle tread part;

connecting the first middle tread part to a second tread shoulder part, the first middle tread part having a part of a first tread design;

connecting the second tread shoulder part to a second upper sidewall part;

disconnecting the first middle tread part from the first tread shoulder part and the second tread shoulder part; and connecting a second middle tread part to the first tread shoulder part and the second tread shoulder part, the second middle tread part having part of a second tread design.

12. The method as set forth in claim 11 further including the steps of:

disconnecting the first tread shoulder part from the first upper sidewall part and the first middle tread part; and connecting a third tread shoulder part to the first upper sidewall part and the first middle tread part, the first tread shoulder part having part of a tread design different from a part of another tread design of the third tread shoulder part.

13. The method as set forth in claim 11 further including the step of removably attaching the first tread shoulder part to the first middle tread part by a plurality of projections extending from both the first tread shoulder part and the first middle tread part, respectively, to the first middle tread part and the first tread shoulder part, respectively, to corresponding recesses in the first middle tread part and the first tread shoulder part, respectively.

14. The method as set forth in claim 11 further including the step of removably attaching the first middle tread part to the second tread shoulder part by a plurality of projections extending from both the first middle tread part and the second tread shoulder part, respectively, to the second tread shoulder part and the first tread shoulder part, respectively, to corresponding recesses in the first tread shoulder part and the second tread shoulder part, respectively.

15. The method as set forth in claim 11 further including the step of removably attaching the first middle tread part to the second tread shoulder part by a plurality of projections extending from both the middle tread part and the second tread shoulder part, respectively, to the second tread shoulder part and the middle tread part, respectively, to corresponding recesses in the middle tread part and the second tread shoulder part, respectively.

16. The method as set forth in claim 11 further including the step of removably attaching the second tread shoulder part to the second upper sidewall part by a plurality of projections extending from the second upper sidewall part to corresponding recesses in the second tread shoulder part.

17. The method as set forth in claim 11 further including the step of removably attaching the first tread shoulder part to the second middle tread part by a plurality of projections extending from both the first tread shoulder part and the second middle tread part, respectively, to the second middle tread part and the first tread shoulder part, respectively, to corresponding recesses in the second middle tread part and the first tread shoulder part, respectively.

* * * * *